(12) United States Patent
Kondo et al.

(10) Patent No.: US 11,385,131 B2
(45) Date of Patent: Jul. 12, 2022

(54) DETACHMENT DETERMINING DEVICE AND CONTROL UNIT

(71) Applicant: KAWASAKI JUKOGYO KABUSHIKI KAISHA, Kobe (JP)

(72) Inventors: Akihiro Kondo, Kobe (JP); Hideyasu Muraoka, Akashi (JP); Yuki Nakayama, Amagasaki (JP); Hiroaki Shimizu, Akashi (JP)

(73) Assignee: KAWASAKI JUKGYO KABUSHIKI KAISHA, Kobe (JP)

( * ) Notice: Subject to any disclaimer, the term of this patent is extended or adjusted under 35 U.S.C. 154(b) by 289 days.

(21) Appl. No.: 16/643,761

(22) PCT Filed: Aug. 22, 2018

(86) PCT No.: PCT/JP2018/030962
§ 371 (c)(1),
(2) Date: Mar. 2, 2020

(87) PCT Pub. No.: WO2019/044617
PCT Pub. Date: Mar. 7, 2019

(65) Prior Publication Data
US 2020/0225116 A1 Jul. 16, 2020

(30) Foreign Application Priority Data

Aug. 31, 2017 (JP) ............................. JP2017-167465

(51) Int. Cl.
*H02H 1/00* (2006.01)
*G01M 13/00* (2019.01)
(Continued)

(52) U.S. Cl.
CPC .............. *G01M 13/00* (2013.01); *E02F 9/26* (2013.01); *H01F 7/064* (2013.01); *B66F 9/24* (2013.01); *E02F 9/22* (2013.01)

(58) Field of Classification Search
None
See application file for complete search history.

(56) References Cited

U.S. PATENT DOCUMENTS 4,046,426 A * 9/1977 Miyake ................... B60T 8/425
303/159
5,343,703 A * 9/1994 Kamimura .............. B64C 13/40
91/461

(Continued)

FOREIGN PATENT DOCUMENTS

JP 4399524 B2 1/2010
JP 2016-098528 A 5/2016

*Primary Examiner* — Stephen W Jackson
(74) *Attorney, Agent, or Firm* — Oliff PLC

(57) ABSTRACT

The present invention provides a low-cost detachment determining device capable of determining whether or not an electromagnetic valve-equipped device has been detached. The detachment determining device determines whether or not at least a part of an electromagnetic valve-equipped device included in an industrial machine, such as a construction machine or an industrial vehicle, has been detached from the industrial machine, the electromagnetic valve-equipped device being a hydraulic device equipped with an electromagnetic valve. The detachment determining device includes: an electrical characteristic detecting portion configured to output a detection signal to the electromagnetic valve-equipped device and detect an electrical characteristic of the electromagnetic valve-equipped device based on the detection signal; and a detachment determining portion configured to determine, based on a plurality of electrical characteristics detected at different time points by the electrical characteristic detecting portion, whether or not at least a part of the electromagnetic valve-equipped device has been detached.

7 Claims, 8 Drawing Sheets

(51) Int. Cl.
*E02F 9/26* (2006.01)
*H01F 7/06* (2006.01)
*B66F 9/24* (2006.01)
*E02F 9/22* (2006.01)

(56) References Cited

U.S. PATENT DOCUMENTS

| | | | | |
|---|---|---|---|---|
| 2003/0146845 A1* | 8/2003 | Imanishi | ............... | F04B 51/00 340/679 |
| 2005/0187070 A1* | 8/2005 | Takagi | ............... | F16H 61/061 477/143 |
| 2018/0162332 A1* | 6/2018 | Nakazawa | ............ | B60T 13/686 |

* cited by examiner

DETACHMENT DETERMINING DEVICE AND CONTROL UNIT

TECHNICAL FIELD

The present invention relates to a detachment determining device configured to determine whether or not an electromagnetic valve-equipped device included in an industrial machine, such as a construction machine or an industrial vehicle, has been detached, and a control unit including the detachment determining device.

BACKGROUND ART

Construction machines (such as hydraulic excavators and wheel loaders) and industrial vehicles (such as forklifts) can perform various types of work by moving attachments (such as buckets and forks). According to the construction machines and industrial vehicles having such function, the attachments are moved by operating hydraulic actuators (such as hydraulic cylinders and hydraulic motors). The hydraulic actuators are driven by being supplied with operating oil. The construction machines and industrial vehicles include hydraulic devices configured to supply the operating oil to the hydraulic actuators. One example of the hydraulic devices is a hydraulic device equipped with an electromagnetic valve (hereinafter may be referred to as an "electromagnetic valve-equipped device"), and examples of the electromagnetic valve-equipped device include a hydraulic pump, a pilot flow control valve, and a multi-control valve constituted by a plurality of pilot flow control valves. In the hydraulic pump, a servo piston of a regulator is moved by pilot pressure output from the electromagnetic valve. In the pilot flow control valve, a spool is moved by pilot pressure output from the electromagnetic valve.

As with other devices, the electromagnetic valve-equipped device configured as above may be required to be replaced due to breakdown and is actually replaced once in a while. Typically, the hydraulic device is replaced with a proper hydraulic device, and with this, the function of the hydraulic device is secured. Therefore, when replacing the hydraulic device, it is preferable to use a proper product (proper hydraulic device) having the same quality as the electromagnetic valve-equipped device equipped in a construction machine or industrial vehicle when the construction machine or industrial vehicle is assembled and manufactured. When part replacement is performed in, for example, a certified factory certified by a manufacturer of the construction machine or industrial vehicle, the above-described proper product (proper hydraulic device) is used as a replacement part. However, in a factory other than the certified factory, an improper product (improper hydraulic device) that is low in function or quality may be used as the replacement part. In such a case, the hydraulic device may not be able to exert a desired function. In order to prevent the use of the improper product at the time of replacement, for example, devices of PTLs 1 and 2 are known.

CITATION LIST

Patent Literature

PTL 1: Japanese Patent No. 4399524
PTL 2: Japanese Laid-Open Patent Application Publication No. 2016-98528

SUMMARY OF INVENTION

Technical Problem

An identification device of PTL 1 performs individual identification of replaceable parts based on information stored in IC chips. This can prevent the use of the improper product at the time of replacement. However, the IC chips need to be attached to the respective parts, and sensors configured to detect the information of the IC chips need to be arranged at various places. Therefore, the number of parts increases, and the manufacturing cost increases. Further, according to an improper part use prevention system of PTL 2, replacement parts are managed by attaching part IDs to the replaceable parts and transmitting the part IDs to a data server at the time of replacement. Therefore, the data server is required, and a wireless communication apparatus for communication with the data server is also required. Thus, the manufacturing cost increases. As above, according to known improper product replacement prevention countermeasures, the manufacturing cost increases.

Further, when the proper product is used as the replacement part, but the replacement is performed in a factory other than the certified factory, whether or not the replacement work is performed in accordance with a predetermined procedure (including not only the order of steps of the replacement work but also work details in the respective steps) is unclear. If the replacement work is not performed in accordance with the predetermined procedure, even the proper product that is the hydraulic device may not exert a desired function as with when the improper product is used. Therefore, it is preferable to detect not only whether or not the improper product is provided as the replacement part but also part detachment itself which indicates the start of the replacement work.

An object of the present invention is to provide a detachment determining device configured to determine at low cost whether or not an electromagnetic valve-equipped device has been detached, and a control unit including the detachment determining device.

Solution to Problem

A detachment determining device of the present invention is a detachment determining device configured to determine whether or not at least a part of an electromagnetic valve-equipped device included in an industrial machine, such as a construction machine or an industrial vehicle, has been detached from the industrial machine, the electromagnetic valve-equipped device being a hydraulic device equipped with an electromagnetic valve. The detachment determining device includes: an electrical characteristic detecting portion configured to output a detection signal to the electromagnetic valve-equipped device and detect an electrical characteristic of the electromagnetic valve-equipped device based on the detection signal; and a detachment determining portion configured to determine, based on electrical characteristics detected at different time points by the electrical characteristic detecting portion, whether or not at least a part of the electromagnetic valve has been detached.

According to the present invention, the detection signal is output to the electromagnetic valve-equipped device, and the electrical characteristic of the electromagnetic valve-equipped device is detected. With this, whether or not at least a part of the electromagnetic valve-equipped device (i.e., the electromagnetic valve-equipped device itself, the electromagnetic valve, or a component of the electromagnetic valve-equipped device other than the electromagnetic valve) has been detached can be determined based on the difference between the electrical characteristics detected at different time points. To be specific, whether or not the electromagnetic valve-equipped device has been detached can be determined without providing IC chips, sensors for detecting the IC chips, and the like, or without managing part IDs in a data server. Therefore, the manufacturing cost of the detachment determining device can be reduced.

In the above invention, the electrical characteristic detecting portion may output the detection signal to a resistor portion arranged in the electromagnetic valve and grounded through a component of the electromagnetic valve-equipped device other than the electromagnetic valve and detect the electrical characteristic of the resistor portion based on the detection signal.

According to the above configuration, whether or not each of the entire electromagnetic valve-equipped device and a component of the electromagnetic valve-equipped device has been detached can be easily determined only by attaching the resistor portion to the electromagnetic valve. Since parts attached to the respective electromagnetic valves are the resistor portions, an increase in the manufacturing cost can be suppressed.

In the above invention, the resistor portion may be a thermistor.

According to the above configuration, whether or not the electromagnetic valve-equipped device has been replaced can be determined by utilizing a resistance change of the thermistor with respect to an ambient temperature.

In the above invention, the electrical characteristic detecting portion may output the detection signal to the electromagnetic valve-equipped device and detect, as the electrical characteristic, a stray capacitance of a wire portion connected to the electromagnetic valve-equipped device.

According to the above configuration, whether or not the electromagnetic valve-equipped device has been detached can be determined by detecting the stray capacitance of the wire portion of the electromagnetic valve-equipped device. Since the stray capacitance is surely generated at the electromagnetic valve-equipped device, whether or not the electromagnetic valve-equipped device has been detached can be determined without providing an additional part configured to perform determination at the electromagnetic valve-equipped device. Therefore, the manufacturing cost of the hydraulic device can be reduced.

A control unit of the present invention includes: the above-described detachment determining device; an electromagnetic valve driving portion configured to supply a current to the electromagnetic valve of the electromagnetic valve-equipped device to drive the electromagnetic valve; a power supply device configured to supply electric power; a main power supply portion connected to the power supply device and configured to supply the electric power from the power supply device to the electrical characteristic detecting portion and detachment determining portion of the detachment determining device; a main power supply switching unit interposed between the power supply device and the main power supply portion and configured to switch between on and off of electric power supply from the power supply device to the main power supply portion; and a bypass power supply switching portion configured to supply the electric power from the power supply device to the main power supply portion at predetermined time intervals when the electric power supply from the power supply device to the main power supply portion is in an off state by the main power supply switching unit.

According to the above configuration, even when the electric power supply to the main power supply portion is switched to an off state by the power supply switching portion, the electric power can be supplied to the main power supply portion by the bypass power supply switching portion. To be specific, whether or not the electromagnetic valve-equipped device has been detached can be determined even when the electric power supply to the main power supply portion is in an off state by the power supply switching portion.

A control unit of the present invention includes: the above-described detachment determining device; an electromagnetic valve driving portion configured to supply a current to the electromagnetic valve of the electromagnetic valve-equipped device to drive the electromagnetic valve; a power supply device configured to supply electric power; a main power supply portion connected to the power supply device and configured to supply the electric power from the power supply device to the electromagnetic valve driving portion; a main power supply switching unit interposed between the power supply device and the main power supply portion and configured to switch between on and off of electric power supply from the power supply device to the main power supply portion; and a sub power supply portion connected to the power supply device without through the main power supply switching unit and configured to supply the electric power from the power supply device to the electrical characteristic detecting portion and detachment determining portion of the detachment determining device.

According to the above configuration, whether or not the electromagnetic valve-equipped device has been detached can be detected regardless of whether the main power supply switching unit is in an on state or an off state.

In the above invention, the control unit may further include a function restricting portion configured to restrict a function of the electromagnetic valve-equipped device when the detachment determining portion determines that at least a part of the electromagnetic valve-equipped device has been detached.

According to the above configuration, when the electromagnetic valve-equipped device is replaced in accordance with a procedure that is not a genuine procedure, the function of the replaced electromagnetic valve-equipped device can be restricted. With this, it is possible to prevent a case where the electromagnetic valve-equipped device is replaced with an improper product, or the electromagnetic valve-equipped device is replaced in an improper factory or the like, and then, various parts of the hydraulic device are damaged by the use of an industrial machine, such as a construction machine or an industrial vehicle.

Advantageous Effects of Invention

According to the present invention, whether or not the electromagnetic valve-equipped device has been detached can be determined, and the manufacturing cost can be reduced.

DESCRIPTION OF EMBODIMENTS

Figure 1:
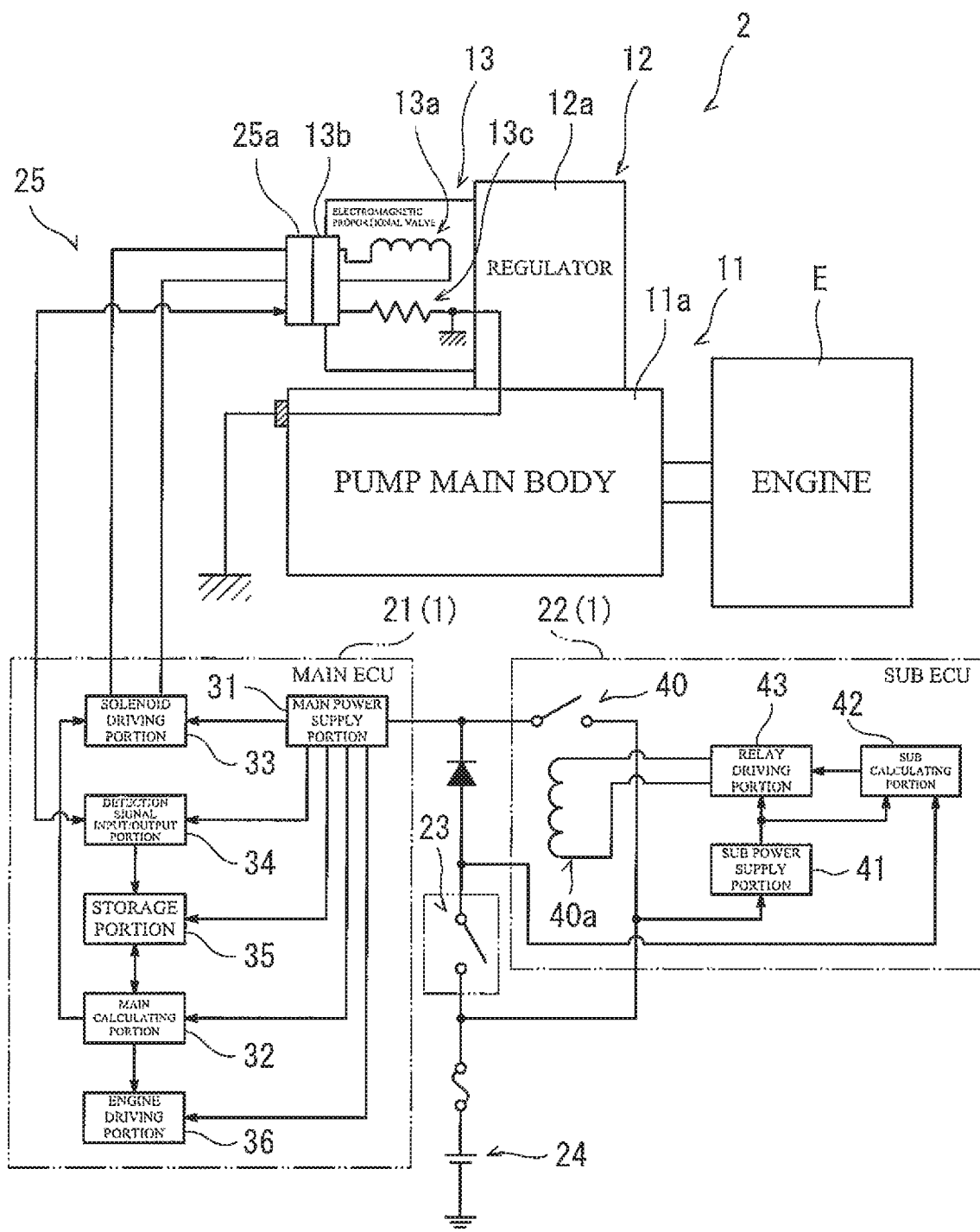
FIG. 1 is a diagram showing a control unit and a hydraulic pump according to Embodiment 1 of the present invention.

Hereinafter, control units 1 and 1A to 1C according to Embodiments 1 to 4 of the present invention will be described with reference to the drawings. Each of the control units 1 and 1A to 1C described below is just one embodiment of the present invention. Therefore, the present invention is not limited to the embodiments, and additions, deletions, and modifications may be made within the scope of the present invention.

Embodiment 1

Construction Machine and Industrial Vehicle

Construction machines and industrial vehicles as examples of industrial machines perform various types of work by moving various attachments. Examples of the construction machines include hydraulic excavators, wheel loaders, cranes, skid steer loaders, and aerial work platform vehicles, and examples of the industrial vehicles are forklifts. These construction machines and industrial vehicles can perform work, such as excavating work, carrying work, and lifting work. A hydraulic excavator as one example of the construction vehicle includes a bucket and performs excavation by the bucket. Further, the hydraulic excavator includes a travelable vehicle body and can carry, for example, excavated sand by making the vehicle body travel. In the hydraulic excavator configured as above, the bucket is attached to the vehicle body through a boom and an arm. The hydraulic excavator performs excavating work by making the bucket, the boom, and the arm swing in front, rear, upper, and lower directions. Further, the hydraulic excavator makes the bucket, the boom, and the arm swing by hydraulic cylinders.

The hydraulic cylinder that is one example of a hydraulic actuator operates by being supplied with operating oil that is pressure oil. To be specific, the hydraulic cylinder expands or contracts in accordance with a flow direction of the operating oil supplied thereto and operates at a speed corresponding to a flow rate of the operating oil supplied thereto. As above, the hydraulic cylinder is driven by the operating oil supplied thereto, and the hydraulic excavator includes a hydraulic device configured to supply the operating oil to the hydraulic cylinder. The hydraulic device includes a hydraulic pump 2, a plurality of flow control valves, a control unit 1, and the like. The hydraulic pump 2 is configured to discharge the operating oil (such as oil or water). The discharged operating oil is introduced to the hydraulic cylinder through the flow control valve. The flow control valve is constituted by an electromagnetic control valve. The flow direction and flow rate of the operating oil flowing to the hydraulic cylinder are changed in accordance with an output from the electromagnetic control valve. The flow control valve configured as above is configured by fitting valves in a valve block. In order to adjust the flow rate of the operating oil flowing to the hydraulic cylinder, the hydraulic pump 2 can change the discharge flow rate of the operating oil. The hydraulic pump 2 having such functions is configured as below.

Hydraulic Pump

As shown in FIG. 1, the hydraulic pump 2 that is one example of the electromagnetic valve-equipped device includes a hydraulic pump main body 11, a regulator 12, and an electromagnetic proportional valve 13. The hydraulic pump main body 11 is coupled to a driving source, such as an output shaft of an engine E, and is rotated by the engine E. By this rotation, the hydraulic pump main body 11 sucks the operating oil from a tank (not shown) and discharges the operating oil. The hydraulic pump main body 11 is a variable displacement swash plate pump and includes a swash plate (not shown). The discharge flow rate of the hydraulic pump main body 11 is changed by changing a tilting angle of the swash plate. The regulator 12 is attached to the swash plate of the hydraulic pump main body 11 having such function. The regulator 12 is formed integrally with a casing 11a of the hydraulic pump main body 11.

The regulator 12 is a mechanism configured to change the tilting angle of the swash plate and includes a servo piston (not shown). The servo piston is arranged in a casing 12a of the regulator 12 and coupled to the swash plate. The servo piston can reciprocate along an axis thereof. The servo piston configured as above can change the tilting angle of the swash plate by changing a position thereof. Further, the servo piston changes the position thereof in accordance with pilot pressure input thereto. The electromagnetic proportional valve 13 configured to supply the pilot pressure to the servo piston is connected to the regulator 12.

The electromagnetic proportional valve 13 is of a direct proportion type and outputs pilot pressure oil having pressure corresponding to a command current input thereto. More specifically, the electromagnetic proportional valve 13 is hydraulically connected to the regulator 12, the tank, and a pilot pump (not shown) that is a pressure source. The electromagnetic proportional valve 13 includes a solenoid 13a. The solenoid proportional valve 13 has a solenoid 13a, and adjusts a hydraulic connection state between the tank and the regulator, a hydraulic connection state between the pilot pump and the regulator, and the opening between them in accordance with a current supplied to the solenoid 13a. To be specific, when a current is not supplied to the solenoid 13a of the electromagnetic proportional valve 13, a pilot circuit of the regulator 12 and the tank are connected to each other. On the other hand, when a current is supplied to the solenoid 13a, communication between the regulator 12 and the tank is closed, and the regulator 12 and the pilot pump are connected to each other. Further, the communication between the regulator 12 and the pilot pump opens at an opening degree corresponding to the current supplied to the solenoid 13a. Therefore, the electromagnetic proportional valve 13 outputs to the regulator 12 the pilot pressure corresponding to the current supplied to the solenoid 13a. With this, the servo piston of the regulator 12 moves to a position corresponding to the command current, and the swash plate tilts at the tilting angle corresponding to the position of the servo piston. To be specific, the tilting angle of the swash plate of the hydraulic pump main body 11 is adjusted to an angle corresponding to the command current.

In the hydraulic pump 2 configured as above, the casing 11a of the hydraulic pump main body 11 and the casing 12a of the regulator 12 are integrally configured, and the electromagnetic proportional valve 13 is attached to the casing 12a of the regulator 12 so as to be fitted in the casing 12a.

As above, the hydraulic pump main body 11, the regulator 12, and the electromagnetic proportional valve 13 are integrally configured in the hydraulic pump 2. The hydraulic pump main body 11, the regulator 12, and the electromagnetic proportional valve 13 are integrally detached from the hydraulic excavator when replacing the hydraulic pump 2. In order to supply the command current to the electromagnetic proportional valve 13, the control unit 1 is connected to the hydraulic pump 2 configured as above.

Control Unit

The control unit 1 includes a CPU (Central Processing Unit), a ROM (Read Only Memory), a RAM (Random Access Memory), and the like (all not shown). The ROM stores programs executed by the CPU, various fixed data, and the like. The programs executed by the CPU are stored in various storage mediums, such as flexible disks, CD-ROMs, and memory cards, and are installed to the ROM from such storage mediums. The RAM configured as above temporarily stores data necessary when executing the programs. The control unit 1 configured as above is connected to the electromagnetic proportional valve 13 and electromagnetic valves of the plurality of flow control valves and controls the flow direction and flow rate of the operating oil flowing through the hydraulic cylinder. To be specific, the control unit 1 controls operations of the electromagnetic proportional valve 13 and the electromagnetic control valve by supplying a current to the electromagnetic proportional valve 13 and the electromagnetic control valve. Further, the control unit 1 can determine whether or not the hydraulic pump 2 including the electromagnetic proportional valve 13 has been detached. The following will mainly describe matters regarding detachment determination. It should be noted that FIG. 1 shows only the electromagnetic proportional valve 13 that is mainly related to the detachment determination, and the electromagnetic valves of the plurality of flow control valves and the like connected to the control unit 1 are not shown.

The control unit 1 includes a main ECU 21 and a sub ECU 22. It should be noted that the main ECU 21 and the sub ECU 22 may be configured integrally or separately. The main ECU 21 that is one example of a detachment determining device is connected to a power supply device 24, such as a battery, through a power supply main switch 23. The main switch 23 that is one example of a power supply switching portion is configured to be able to be turned on and off by a driver or the like. When the main switch 23 is turned on, the power supply device 24 and the main ECU 21 are connected to each other. When the main switch 23 is turned off, the power supply device 24 and the main ECU 21 are disconnected from each other. The main ECU 21 configured as above includes a main power supply portion 31, a main calculating portion 32, a solenoid driving portion 33, a detection signal input/output portion 34, a storage portion 35, and an engine driving portion 36. It should be noted that each of these portions 31 to 36 is constituted by, for example, a circuit.

The main power supply portion 31 is connected to the power supply device 24 through the main switch 23. The main power supply portion 31 is configured to be able to supply electric power, supplied from the power supply device 24, to the above-described portions 32 to 36. When the main power supply portion 31 becomes an electric power suppliable state, the main calculating portion 32 executes various types of processing and outputs commands to the solenoid driving portion 33 and the engine driving portion 36. For example, the hydraulic excavator is equipped with a plurality of operating devices configured to operate the respective hydraulic cylinders, and each hydraulic cylinder operates at a speed corresponding to an operation amount of an operating lever of the corresponding operating device. In order to achieve such function, the main calculating portion 32 calculates the flow rate of the operating oil corresponding to the operation amount of the operating lever and outputs a command corresponding to the calculated flow rate to the solenoid driving portion 33. The solenoid driving portion 33 is a drive circuit configured to drive the electromagnetic proportional valve 13 and is connected to the electromagnetic proportional valve 13 through a harness 25. A 3-pin connector 25a is attached to a tip end of the harness 25. The 3-pin connector 25a can be coupled to a connector 13b of the electromagnetic proportional valve 13. With this, the solenoid driving portion 33 is connected to the solenoid 13a through the harness 25 and the connector 13b. Therefore, the solenoid driving portion 33 can supply to the solenoid 13a a command current corresponding to the command output from the main calculating portion 32. With this, the tilting angle of the swash plate of the hydraulic pump main body 11 can be changed. To be specific, the operating oil can be discharged from the hydraulic pump main body 11 at the flow rate calculated by the main calculating portion 32. In addition to the solenoid 13a, a resistor 13c is connected to the connector 13b of the electromagnetic proportional valve 13.

The resistor 13c is electrically insulated from the solenoid 13a. One end of the resistor 13c is connected to the connector 13b and connected to the main ECU 21 through the connector 25a and the harness 25. The other end of the resistor 13c is connected to the casing 12a of the regulator 12. The casing 12a of the regulator 12 is configured integrally with the casing 11a of the hydraulic pump main body 11 as described above, and the casings 11a and 12a are made of a metal material. The casing 11a of the hydraulic pump main body 11 is grounded through the vehicle body or engine of the hydraulic excavator. To be specific, the other end of the resistor 13c is grounded through the casings 12a and 11a and the vehicle body of the hydraulic excavator. On the other hand, the one end of the resistor 13c is connected to the main ECU 21 as described above. More specifically, the one end of the resistor 13c is connected to the detection signal input/output portion 34 of the main ECU 21 through the harness 25.

The detection signal input/output portion 34 outputs a detection signal to the resistor 13c through the harness 25 and the two connectors 25a and 13b. In the present embodiment, for example, a direct current of a predetermined current value is output as the detection signal to the resistor 13c. In addition to the output of the detection signal, the detection signal input/output portion 34 detects a voltage applied to the resistor 13c at the time of the output of the detection signal. It should be noted that the detection signal is not limited to the direct current of the predetermined current value and may be a voltage of a predetermined voltage value. In this case, the detection signal input/output portion 34 detects a current flowing through the resistor 13c.

The detected voltage (i.e., an electrical characteristic of the resistor 13c) is output from the detection signal input/output portion 34 to the storage portion 35, and the storage portion 35 stores the detected voltage. Further, the storage portion 35 stores the voltage in association with a time point at which the voltage is stored. The storage portion 35 stores a plurality of voltages detected in the past. The detection signal input/output portion 34 having such function outputs the detection signals at predetermined intervals (below-described determination intervals t11; for example, every five minutes; i.e., periodically). The storage portion 35 stores the voltages at the above intervals and accumulates the voltages. The voltages stored as above are used in the main calculating portion 32, and the main calculating portion 32 determines whether or not the hydraulic pump 2 has been detached.

To be specific, the main calculating portion 32 performs the detachment determination by comparing a plurality of voltages (in the present embodiment, two voltages) stored in the storage portion 35 at different time points. More specifically, the main calculating portion 32 compares the voltage stored most recently with the voltage stored immediately before the voltage stored most recently. At this time, when the hydraulic pump 2 has been detached, this means that the harness 25 has been detached from the connector 13b. Therefore, a current cannot be supplied to components beyond the 3-pin connector 25a, and thus, the voltage detected at this time becomes zero. On this account, when the hydraulic pump 2 has been detached, the voltage stored most recently and the voltage stored immediately before the voltage stored most recently are apparently different from each other. Thus, by comparing the two voltages, the main calculating portion 32 can determine that the hydraulic pump 2 has been detached.

When there is no resistor 13c after the hydraulic pump 2 is detached or when an improper product to which the resistor 13c of a desired resistance value is not attached is attached as the hydraulic pump 2, whether or not the hydraulic pump 2 has been detached can be detected by comparing two voltages. To be specific, two voltages detected before and after the above-described improper product is detached are different from each other. Therefore, in this case, whether or not the hydraulic pump 2 has been detached can be determined by comparing two voltages. On the other hand, when the hydraulic pump 2 is not detached, and the connector 25a of the harness 25 and the connector 13b of the proportional valve are continuously in connection with each other, the stored voltages fall within a substantially fixed range. Therefore, the main calculating portion 32 can determine that the hydraulic pump 2 has not been detached. As above, based on two voltages stored at different time points, the main calculating portion 32 can determine whether or not the hydraulic pump 2 has been detached.

It should be noted that the resistor 13c is grounded through the casings 11a and 12a as described above, and the detection signal flows through not only the resistor 13c but also the casings 11a and 12a. Therefore, the voltage detected by the detection signal input/output portion 34 is also influenced by resistance values of the casings 11a and 12a. Unlike the resistor 13c, the resistance values of the casings 11a and 12a tend to be influenced by external environment. Therefore, it is preferable that in order to reduce the influence of the resistance values of the casings 11a and 12a on the voltage detected by the detection signal input/output portion 34, the resistance value of the resistor 13c be set to be larger than each of the resistance values of the casings 11a and 12a. With this, the main calculating portion 32 can more accurately determine whether or not the hydraulic pump 2 has been detached. Further, when the main calculating portion 32 determines that the hydraulic pump 2 has been detached, the main calculating portion 32 serves as a function restricting portion, i.e., outputs a restriction command to the engine driving portion 36.

In order to drive the engine E, the engine driving portion 36 controls a fuel injection quantity, an ignition timing, and the like. More specifically, the engine driving portion 36 controls the fuel injection quantity, the ignition timing, and the like for the engine E to maintain the rotational frequency of the output shaft of the engine E at a predetermined rotational frequency regardless of the magnitude of a pump load. Further, the engine driving portion 36 can set its drive mode to a restriction mode or a normal mode. The normal mode is a mode in which the rotational frequency of the output shaft of the engine E is maintained at the predetermined rotational frequency. The restriction mode is a mode in which the rotational frequency of the output shaft of the engine E is restricted to 40% to 90% of the predetermined rotational frequency. The engine driving portion 36 sets the drive mode to the restriction mode in response to the restriction command output from the main calculating portion 32. With this, the flow rate of the operating oil discharged from the hydraulic pump 2 is restricted, and therefore, the function of the hydraulic device is restricted. It should be noted that in the restriction mode, the engine and the rotational frequency do not necessarily have to be restricted, and pump output horsepower may be restricted to 40% to 90%.

As described above, the main ECU 21 configured as above can change the discharge flow rate of the hydraulic pump 2 and determine whether or not the hydraulic pump 2 has been detached. This determination/control processing is executed by supplying electric power from the main power supply portion 31 to the portions 32 to 36 (mainly the main calculating portion 32, the detection signal input/output portion 34, and the storage portion 35). On the other hand, since the power consumption of the main ECU 21 including the main power supply portion 31 is large, the main power supply portion 31 is supplied with electric power from the power supply device 24 basically while the engine E is driving, i.e., when the main switch 23 is in an on state. To be specific, when a driver or the like turns off the main switch 23, electric power is not supplied to the main power supply portion 31 through the main switch 23, and therefore, the determination/control processing cannot be executed. Therefore, in order to execute the determination/control processing even when the main switch 23 is in an off state, the control unit 1 includes, in addition to the main ECU 21, the sub ECU 22 that is low in power consumption.

The sub ECU 22 has a function of temporarily driving the main ECU 21 when the main switch 23 is in an off state. The sub ECU 22 includes a bypass switch 40. The bypass switch 40 is interposed between the power supply device 24 and the main power supply portion 31 so to be parallel to the main switch 23. The bypass switch 40 is configured to be able to be turned on and off. When the bypass switch 40 is turned on, electric power can be supplied from the power supply device 24 to the main power supply portion 31 without through the main switch 23. When the bypass switch 40 is turned off, electric power supply from the power supply device 24 to the main power supply portion 31 is stopped. As above, even when the main switch 23 is in an off state, electric power can be supplied from the power supply device 24 to the main power supply portion 31 by the bypass switch 40. In order to operate the bypass switch 40 configured as above, the sub ECU 22 further includes a sub power supply portion 41, a sub calculating portion 42, and a relay driving portion 43. It should be noted that each of these portions 41 to 43 is constituted by, for example, a circuit.

The sub power supply portion 41 is connected to the power supply device 24 without through the main switch 23 and the bypass switch 40 and is supplied with electric power from the power supply device 24 at all times. The sub power supply portion 41 is also connected to the sub calculating portion 42 and the relay driving portion 43. The sub calculating portion 42 is driven by electric power supplied from the sub power supply portion 41. The sub calculating portion 42 can determine a state of the main switch 23 (i.e., whether the main switch 23 is in an on state or an off state). In order to make the main ECU 21 perform the determination/control processing at predetermined intervals, the sub calculating portion 42 outputs a bypass power supply command and a bypass power supply stop command at the intervals when the main switch 23 is in an off state. These commands output from the sub calculating portion 42 are input to the relay driving portion 43, and the relay driving portion 43 operates in accordance with the input commands. More specifically, the bypass switch 40 includes a relay 40a, and the relay driving portion 43 is connected to the relay 40a. When the bypass power supply command is input to the relay driving portion 43, the relay driving portion 43 supplies a current to the relay 40a to turn on the bypass switch 40. When the bypass power supply stop command is input to the relay driving portion 43, the relay driving portion 43 stops the supply of the current to the relay 40a to turn off the bypass switch 40.

In the sub ECU 22 configured as above, the sub calculating portion 42 outputs drive signals to the relay driving portion 43 at predetermined intervals. With this, even when the main switch 23 is in an off state, the bypass switch 40 is turned on at predetermined intervals, and electric power is supplied to the main power supply portion 31. Thus, even when the main switch 23 is in an off state, whether or not the hydraulic pump 2 has been detached can be determined. When a time period corresponding to the predetermined interval elapses, the sub calculating portion 42 outputs a stop signal to the relay driving portion 43. With this, the bypass switch 40 is turned off, and therefore, electric power supply to the main power supply portion 31 is stopped. Thus, the main ECU 21 can be prevented from driving at all times, and the determination/control processing can be executed while reducing the electric power consumption.

As above, the control unit 1 includes: the main ECU 21 configured to perform the determination/control processing; and the sub ECU 22 configured to temporarily drive the main ECU 21 even when the main switch 23 is in an off state. By these two ECUs 21 and 22, the control unit 1 determines at the above intervals whether or not the hydraulic pump 2 has been detached. Hereinafter, the determination/control processing executed by the control unit 1 will be described with reference to the flow charts of FIGS. 2 and 3.

Determination/Control Processing

Figure 2:
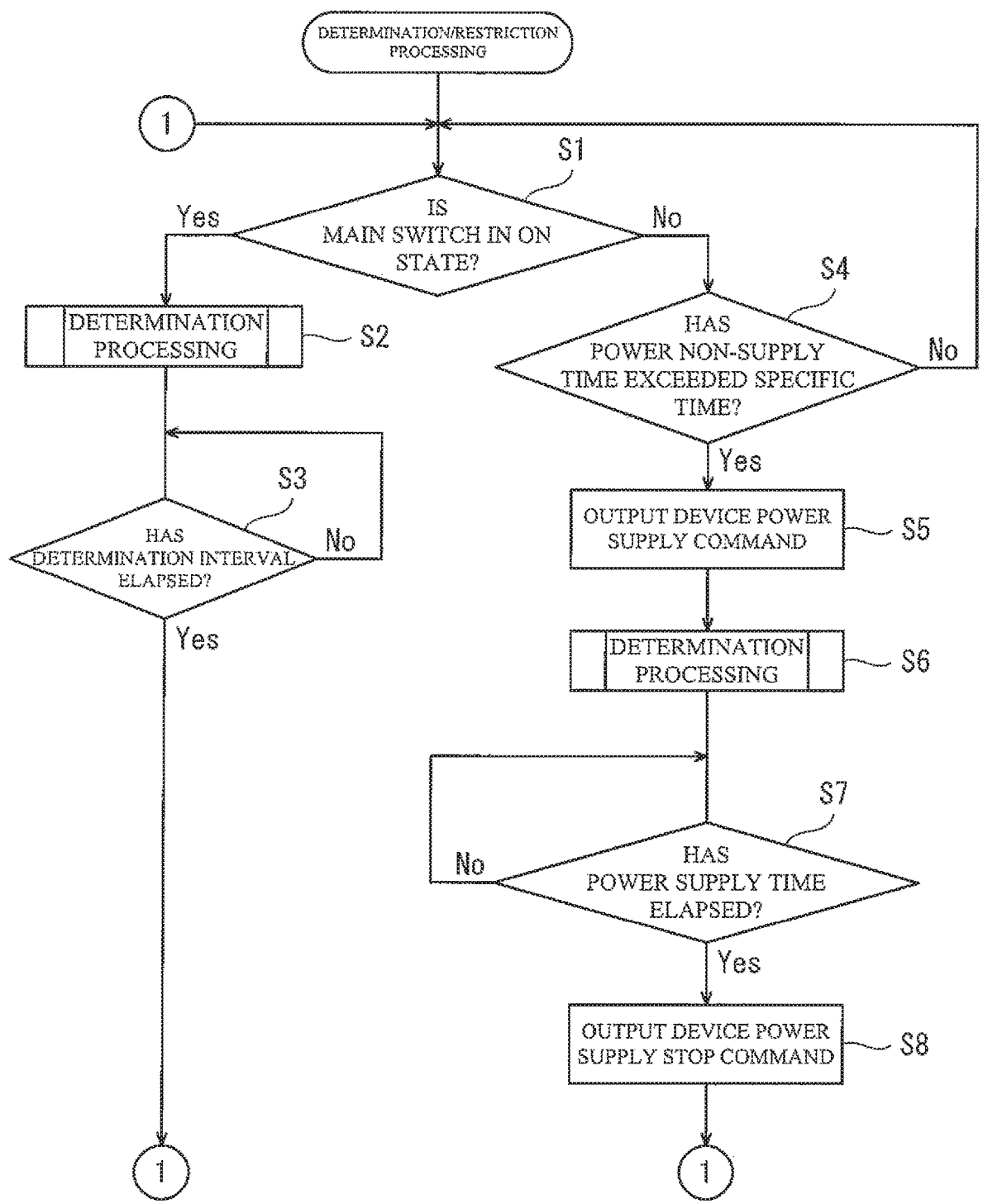
FIG. 2 is a flow chart showing a procedure of determination/control processing executed by the control unit of FIG. 1.

The determination/control processing shown in FIG. 2 is executed at all times by the control unit 1. First, Step S1 is executed. In Step S1 that is an on/off determining step, whether the main switch 23 is in an on state or an off state is determined. To be specific, the sub calculating portion 42 of the sub ECU 22 determines the state of the main switch 23. When the main switch 23 is in an on state, the process proceeds to Step S2. In Step S2 that is a determination processing executing step, the main calculating portion 32 executes the determination processing, and the process proceeds to Step S11 of FIG. 3. In Step S11 that is an operation determining step, whether or not all the operating levers of the plurality of operating devices included in the hydraulic excavator are located at respective neutral positions is determined, i.e., whether or not all the operating levers are not operated is determined. When the operating lever(s) is being operated, the detachment determination cannot be performed. Therefore, the determination processing is terminated, and the process proceeds to Step S3 of FIG. 2. On the other hand, when all the operating levers are located at the respective neutral positions, the process proceeds to Step S12.

In Step S12 that is a detection signal output and detecting step, the detection signal is output from the detection signal input/output portion 34 to the resistor 13c, and the voltage applied to the resistor 13c is detected. After the voltage is detected, the process proceeds to Step S13. In Step S13 that is an electrical characteristic storing step, the voltage detected in Step S12 is stored in the storage portion 35 in association with a time point at which the voltage is detected. After the voltage and the time point are stored in the storage portion 35, the process proceeds to Step S14.

In Step S14 that is a detachment determination step, the main calculating portion 32 determines whether or not the hydraulic pump 2 has been detached. To be specific, the main calculating portion 32 compares the voltage stored in Step S13 (i.e., a most-recently measured value) with a voltage stored immediately before the voltage stored in Step S13 (i.e., a previously measured value) and determines whether or not the most-recently measured value and the previously measured value coincide with each other. It should be noted that: a case where the most-recently measured value and the previously measured value coincide with each other is not necessarily limited to a case where the most-recently measured value and the previously measured value completely coincide with each other, and an absolute value of a difference between the most-recently measured value and the previously measured value is only required to be smaller than a predetermined threshold. When the main calculating portion 32 determines that these two measured values coincide with each other, the main calculating portion 32 determines that the hydraulic pump 2 has not been detached. Then, the process proceeds to Step S15.

In Step S15 that is a normal mode setting step, the main calculating portion 32 sets the drive mode of the engine driving portion 36 to the normal mode. When the drive mode of the engine driving portion 36 is set to the normal mode, the engine driving portion 36 controls the fuel injection quantity, the ignition timing, and the like for the engine E in accordance with the pump load, and as a result, the rotational frequency of the output shaft of the engine E is maintained at a predetermined rotational frequency. On the other hand, when the main calculating portion 32 determines in Step S14 that the hydraulic pump 2 has been detached, the process proceeds to Step S16. In Step S16 that is a restriction mode setting step, the main calculating portion 32 sets the drive mode of the engine driving portion 36 to the restriction mode. When the drive mode of the engine driving portion 36 is set to the restriction mode, the engine driving portion 36 controls the fuel injection quantity, the ignition timing, and the like for the engine E such that the output shaft rotates at a rotational frequency that is 40% to 90% of the predetermined rotational frequency. Thus, when the hydraulic pump 2 is detached (i.e., replaced), the ability of the hydraulic pump 2 is restricted. After the drive mode of the engine driving portion 36 is set in Step S15 or S16 as above, the determination processing is terminated. After the determination processing is terminated, the process proceeds to Step S3 of FIG. 2.

In Step S3 that is an interval determining step, whether or not an elapsed time t1 since the output of the detection signal in Step S12 of the determination processing has reached the predetermined determination interval t11 is determined. To be specific, when the detection signal input/output portion 34 outputs the detection signal in Step S12, the detection signal input/output portion 34 measures the elapsed time t1.

When the elapsed time t1 has not reached the determination interval t11, the detection signal input/output portion 34 repeats the determination of Step S3 until the elapsed time t1 reaches the determination interval t11. On the other hand, when the measurement time reaches the determination interval t11, the process returns to Step S1, and the sub calculating portion 42 determines the state of the main switch 23 again. Further, when the sub calculating portion 42 determines in Step S1 that the main switch 23 is in an off state, the process proceeds to Step S4.

In Step S4 that is a drive interval determining step, whether or not an elapsed time (i.e., a power non-supply time) t2 since the output of the bypass power supply command to the relay driving portion 43 has exceeded a predetermined specific time t21 is determined. When the sub calculating portion 42 measures the power non-supply time t2 and determines that the power non-supply time t2 has not exceeded the specific time t21, the process returns to Step S1. On the other hand, when the sub calculating portion 42 determines that the power non-supply time t2 has exceeded the specific time t21, the process proceeds to Step S5. In Step S5 that is a bypass power supply command output step, the sub calculating portion 42 outputs the bypass power supply command to the relay driving portion 43 to operate the relay 40a. With this, the bypass switch 40 is turned on, and electric power is supplied from the power supply device 24 through the main power supply portion 31 to the main calculating portion 32, the detection signal input/output portion 34, and the storage portion 35. After the bypass switch 40 is turned on as above, the process proceeds to Step S6.

Figure 3:
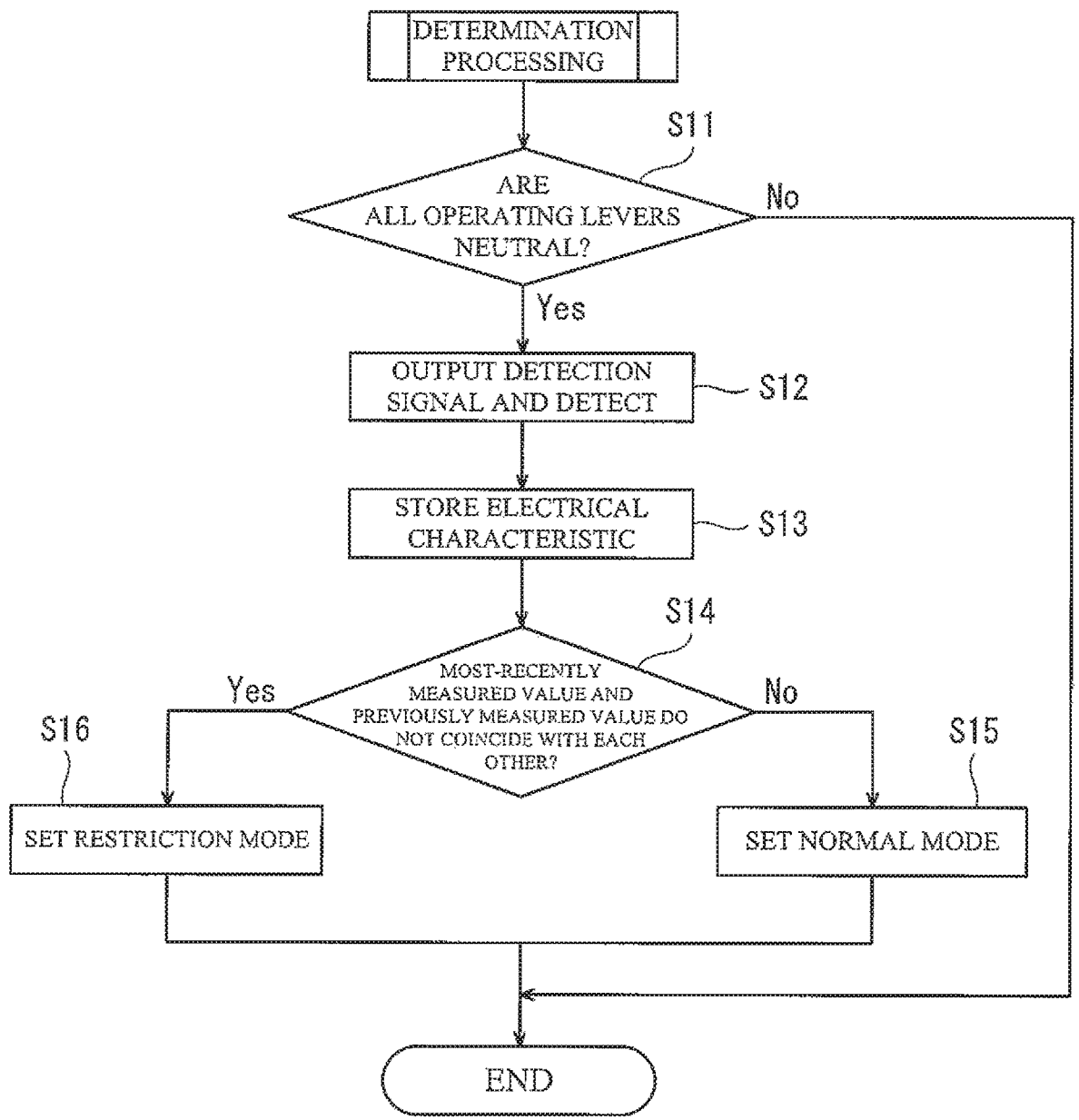
FIG. 3 is a flow chart showing a procedure of determination processing of FIG. 2.

In Step S6 that is the determination processing executing step, as with Step S2, the determination processing is executed by the main calculating portion 32, and the process proceeds to Step S12 of FIG. 3. To be specific, in Step S12 that is a detection signal output step, the voltage is detected by outputting the detection signal to the resistor 13c, and the voltage detected in Step S13 that is the electrical characteristic storing step is stored in the storage portion 35. Further, based on the two voltages stored in Step S14 that is the detachment determination step, the main calculating portion 32 determines whether or not the hydraulic pump 2 has been detached. When the main calculating portion 32 determines that the hydraulic pump 2 has not been detached, the process proceeds to Step S15, and in Step S15 that is the normal mode setting step, the drive mode of the engine driving portion 36 is set to the normal mode. On the other hand, when the main calculating portion 32 determines that the hydraulic pump 2 has not been detached, the process proceeds to Step S16, and in Step S16 that is the restriction mode setting step, the drive mode of the engine driving portion 36 is set to the restriction mode. After the drive mode is set as above, the determination processing is terminated. After the determination processing is terminated, the process proceeds to Step S7 of FIG. 2.

In Step S7 that is a drive time measuring step, whether or not the power non-supply time t2 that is the elapsed time since the output of the bypass power supply command to the relay driving portion 43 has reached a predetermined drive time t22 is determined. When the sub calculating portion 42 measures the power non-supply time and determines that the power non-supply time t2 has not reached the drive time t22, the determination of Step S7 is repeated. On the other hand, when the sub calculating portion 42 determines that the power non-supply time t2 has reached the drive time t22, the process proceeds to Step S8. In Step S8 that is a bypass power supply stop command output step, the sub calculating portion 42 outputs the bypass power supply stop command to the relay driving portion 43 to stop the operation of the relay 40a. With this, the bypass switch 40 is turned off, and electric power supply from the power supply device 24 to the main power supply portion 31 is stopped. After the bypass switch 40 is turned off as above, the process returns to Step S1, and the sub calculating portion 42 determines the state of the main switch 23 again.

The control unit 1 configured as above can compare the voltages, applied to the resistor 13c, to determine whether or not the hydraulic pump 2 has been detached, the voltages being the electrical characteristics of the electromagnetic proportional valve 13 of the hydraulic pump 2. To be specific, whether or not the hydraulic pump 2 has been detached can be determined without providing IC chips, sensors for detecting the IC chips, and the like, or without managing part IDs in a data server. Therefore, whether or not the hydraulic pump 2 has been detached can be determined while suppressing an increase in the manufacturing cost of the control unit 1. Further, whether or not the hydraulic pump 2 has been detached can be easily determined only by attaching the resistor 13c to the electromagnetic proportional valve 13. In addition, since parts attached to the respective electromagnetic proportional valves 13 are the resistors 13c, the increase in the manufacturing cost can be suppressed. Further, since the resistor 13c is grounded through the hydraulic pump main body 11 and the regulator 12, not only whether or not the electromagnetic proportional valve 13 has been detached but also whether or not the hydraulic pump main body 11 and the regulator 12 have been detached can be determined.

The control unit 1 of the present embodiment includes the sub ECU 22 in addition to the main ECU 21. Even when the main switch 23 is in an off state, the detachment determination can be performed by the sub ECU 22. For example, replacing the hydraulic pump 2 is performed when the main switch 23 is in an off state. When the main switch 23 is in an off state, the hydraulic pump 2 is detached. According to the control unit 1, even when the main switch 23 is turned off, and the replacement work is being performed, the detachment work can be detected. Further, by detecting the detachment work, the drive mode can be set to the restriction mode. To be specific, if the hydraulic pump 2 is replaced in accordance with a procedure that is not a genuine procedure, the function of the hydraulic pump 2 is restricted. Therefore, it is possible to prevent a case where the hydraulic pump 2 is replaced in a factory other than certified factories and the like certified by a manufacturer or the like, and then, various parts of the hydraulic device are damaged by the use of the hydraulic excavator.

It should be noted that the control unit 1 has an initializing mode in which the voltages stored in the storage portion 35 are deleted. When replacing the hydraulic pump 2 in a certified factory or the like certified by a manufacturer or the like, the voltages stored in the storage portion 35 are deleted in the initializing mode. With this, when the replacement is performed in the certified factory or the like, the drive mode is not set to the restriction mode even after the replacement, and the function of the hydraulic pump 2 can be maximally exerted.

Embodiment 2

Figure 4:
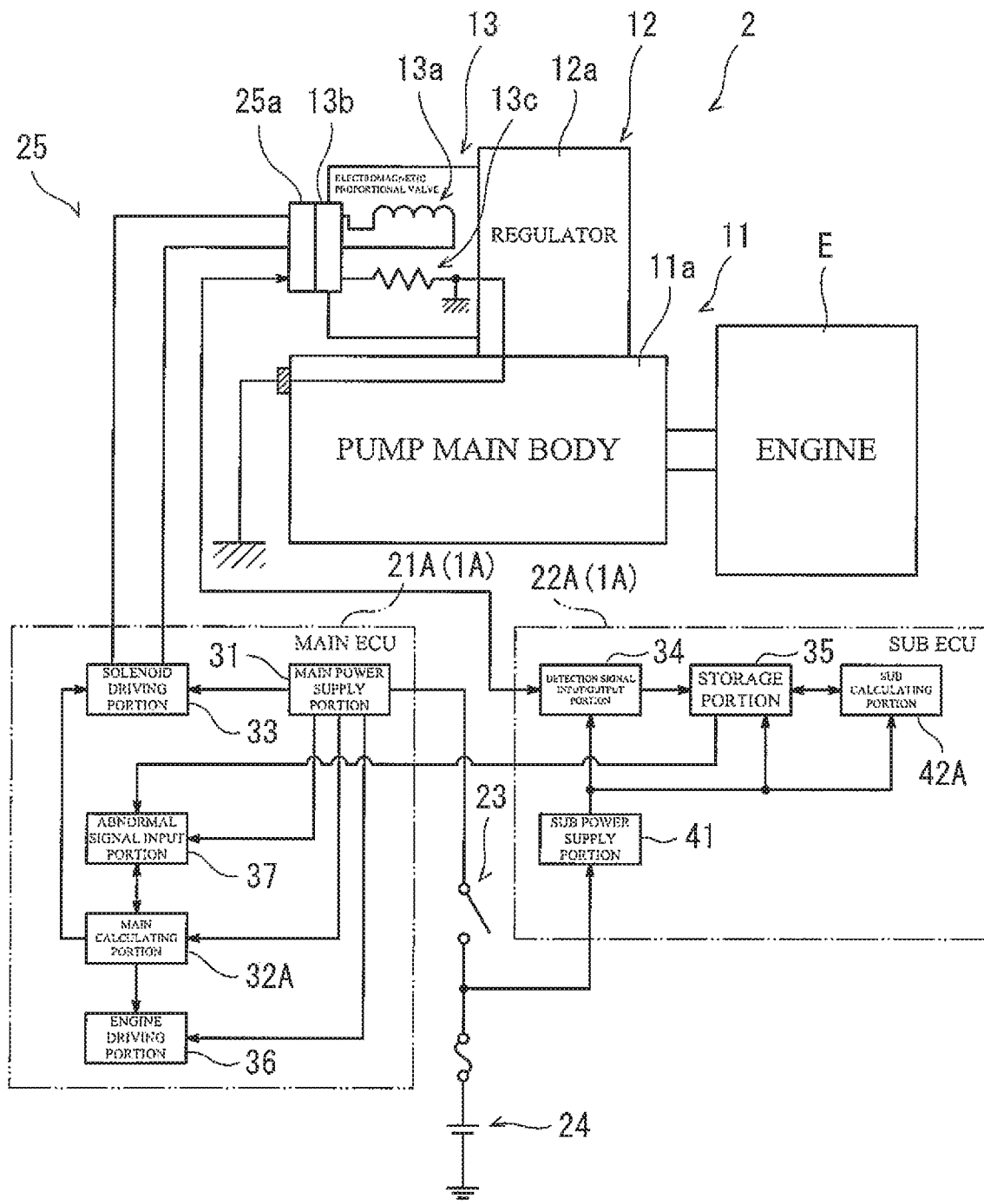
FIG. 4 is a diagram showing a hydraulic pump of a hydraulic device and a control unit according to Embodiment 2 of the present invention.

As shown in FIG. 4, the control unit 1A of Embodiment 2 is similar in configuration to the control unit 1 of Embodiment 1. Therefore, components of the control unit 1A of Embodiment 2 which are different from the components of the control unit 1 of Embodiment 1 will be mainly described. The same reference signs are used for the same components, and explanations thereof are omitted. The same is true in Embodiment 3.

The control unit 1A of Embodiment 2 includes a main ECU 21A and a sub ECU 22A. The main ECU 21A includes the main power supply portion 31, a main calculating portion 32A, the solenoid driving portion 33, the engine driving portion 36, and an abnormal signal acquiring portion 37. The sub ECU 22A includes the sub power supply portion 41, a sub calculating portion 42A, the detection signal input/output portion 34, and the storage portion 35. Regardless of the state of the main switch 23, the sub ECU 22A configured as above determines whether or not the hydraulic pump 2 has been detached.

To be specific, the sub power supply portion 41 of the sub ECU 22A is connected to the sub calculating portion 42A, the detection signal input/output portion 34, and the storage portion 35 and also connected to the power supply device 24 without through the main switch 23. Therefore, the sub calculating portion 42A, the detection signal input/output portion 34, and the storage portion 35 are supplied with electric power regardless of the state of the main switch 23. To be specific, the detection signal input/output portion 34 outputs the detection signal and detects the voltage regardless of the state of the main switch 23 and stores the voltage in the storage portion 35. The sub calculating portion 42A performs the determination/control processing regardless of the state of the main switch 23. To be specific, as with the main calculating portion 32 of Embodiment 1, the sub calculating portion 42A performs the detachment determination by comparing two voltages stored at different time points in the storage portion 35. Further, as with the voltage, the sub calculating portion 42A stores a determination result in the storage portion 35 in association with a time point at which the determination is made. The storage portion 35 stores a plurality of determination results detected in the past. The abnormal signal acquiring portion 37 of the main ECU 21 is further connected to the storage portion 35 having such function.

The abnormal signal acquiring portion 37 is supplied with electric power from the main power supply portion 31 as with the main calculating portion 32A, the solenoid driving portion 33, and the engine driving portion 36. When the abnormal signal acquiring portion 37 is supplied with electric power, the abnormal signal acquiring portion 37 refers to the storage portion 35 of the sub ECU 22. To be specific, when the main switch 23 is turned on, the abnormal signal acquiring portion 37 operates to refer to the determination results stored in the storage portion 35. When the storage portion 35 stores the determination result indicating that the hydraulic pump 2 has been detached, the abnormal signal acquiring portion 37 acquires an abnormal signal based on this determination result. When the abnormal signal acquiring portion 37 acquires the abnormal signal, the main calculating portion 32A outputs the restriction command to the engine driving portion 36. With this, the engine driving portion 36 sets the drive mode to the restriction mode. Thus, the flow rate of the operating oil discharged from the hydraulic pump 2 is restricted, and as a result, the function of the hydraulic device is restricted.

Figure 5:
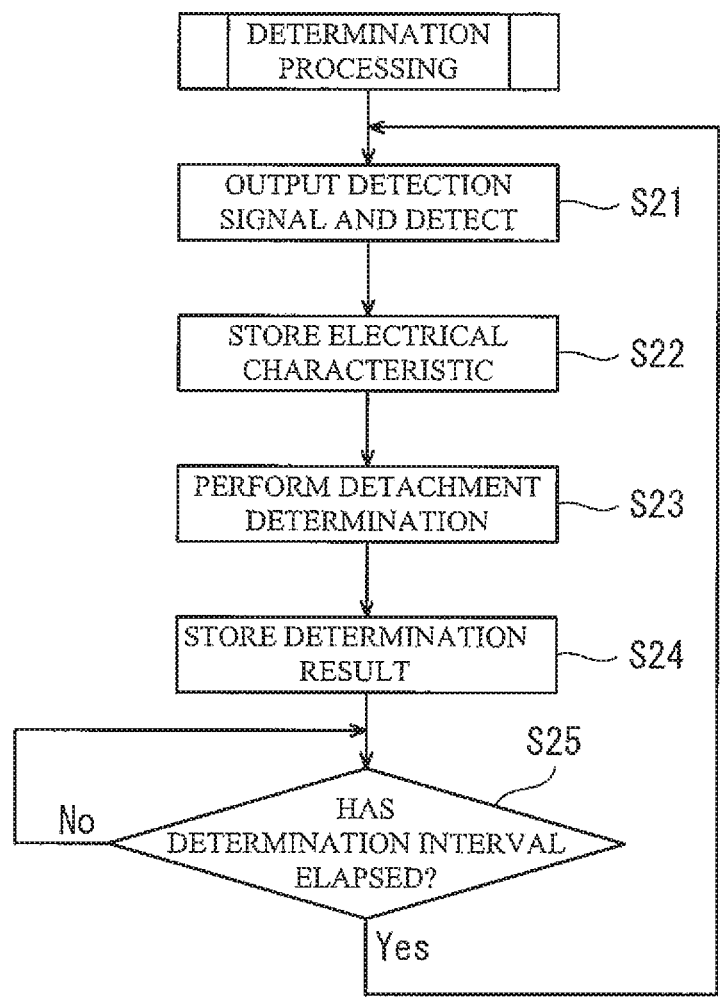
FIG. 5 is a flow chart showing a procedure of determination processing executed by the control unit of FIG. 4.
Figure 6:
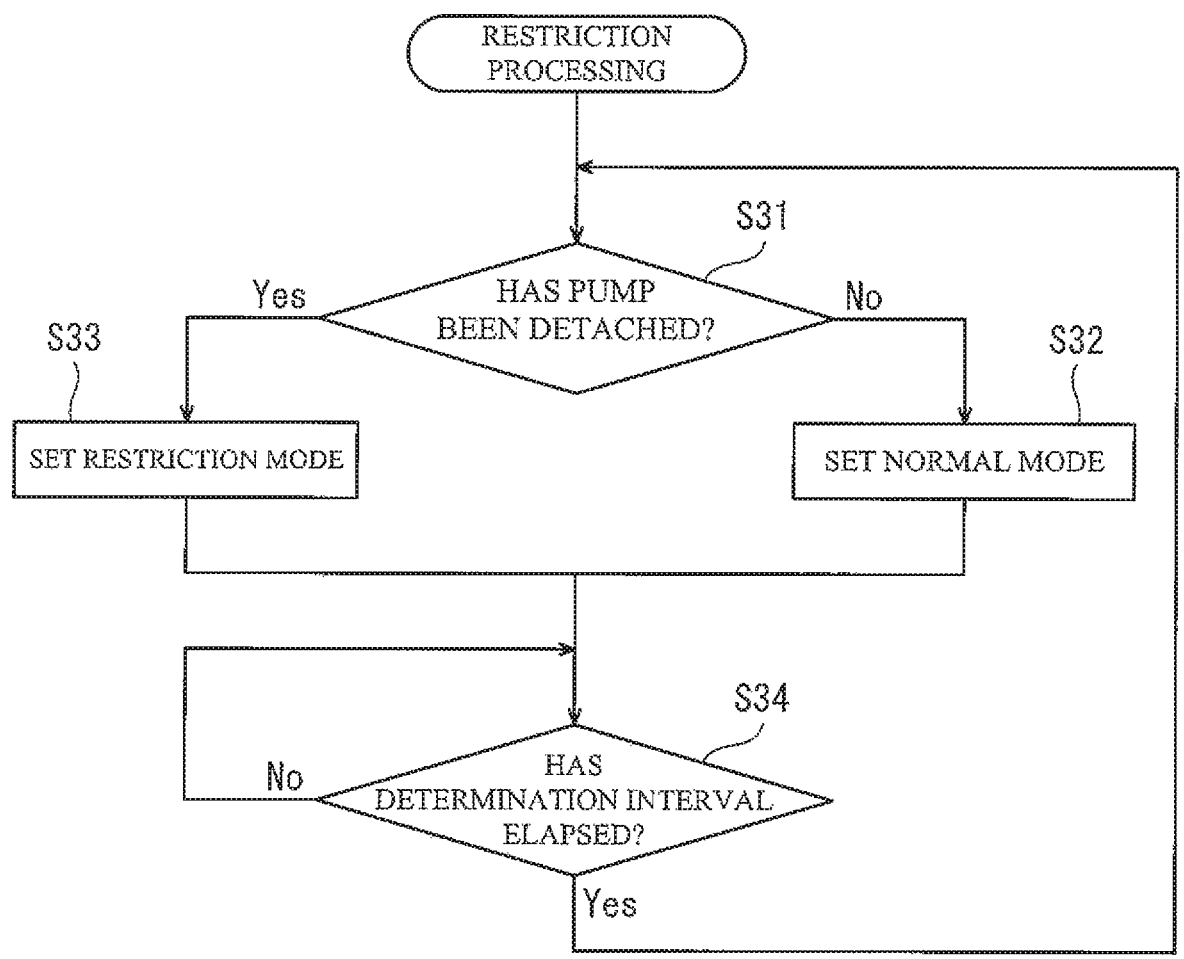
FIG. 6 is a flow chart showing a procedure of restriction processing executed by the control unit of FIG. 4.

In the control unit 1A configured as above, as described above, whether or not the hydraulic pump 2 has been detached is determined by the sub ECU 22A, and the main ECU 21A restricts the function of the hydraulic pump 2 in accordance with the determination result. To be specific, the sub ECU 22A executes the determination processing, and the main ECU 21A executes the control processing. Hereinafter, the determination processing executed by the sub ECU 22A will be described with reference to the flow chart of FIG. 5, and the control processing executed by the main ECU 21A will be described with reference to the flow chart of FIG. 6. It should be noted that the determination processing of Embodiment 2 is similar to the determination processing of Embodiment 1.

Determination Processing

The determination processing is executed at all times by the sub ECU 22A. First, Step S21 is executed. To be specific, in Step S21 that is the detection signal output and detecting step, the voltage is detected by outputting the detection signal to the resistor 13c. After the voltage is detected, the process proceeds to Step S22. In Step S22 that is the electrical characteristic storing step, the detected voltage is stored in the storage portion 35 in association with a time point at which the voltage is detected. After the voltage and the time point are stored, the process proceeds to Step S23. In Step S23 that is the detachment determination step, the sub calculating portion 42A determines based on the two stored voltages whether or not the hydraulic pump 2 has been detached. After the determination, the process proceeds to Step S24. In Step S24 that is a determination result storing step, the sub calculating portion 42A stores the determination result of Step S23 in the storage portion 35. After the determination result is stored, the process proceeds to Step S25. In Step S25 that is the interval determining step, whether or not the elapsed time t1 since the output of the detection signal in Step S21 has reached the predetermined determination interval t11 is determined. When it is determined that the elapsed time t1 has not reached the determination interval t11, the determination of Step S25 is repeated until the elapsed time t1 reaches the determination interval t11. On the other hand, when the elapsed time t1 reaches the determination interval t11, the process returns to Step S21, and whether or not the hydraulic pump 2 has been detached is determined again. The determination result regarding whether or not the hydraulic pump 2 has been detached is used in the restriction processing.

Restriction Processing

When the main switch 23 is turned on, and electric power is supplied from the main power supply portion 31 to the main calculating portion 32A, the engine driving portion 36, and the abnormal signal acquiring portion 37, the restriction processing is started. After the restriction processing is started, the process proceeds to Step S31. In Step S31 that is an abnormality determining step, the abnormal signal acquiring portion 37 refers to the determination results stored in the storage portion 35 and determines whether or not the hydraulic pump 2 has been detached. To be specific, the abnormal signal acquiring portion 37 determines whether or not the determination result indicating that the hydraulic pump 2 has been detached is stored in the storage portion 35. When the determination result indicating that the hydraulic pump 2 has been detached is not stored in the storage portion 35, the abnormal signal acquiring portion 37 does not acquire the abnormal signal, and the process proceeds from Step S31 to Step S32. In Step S32 that is the normal mode setting step, since the abnormal signal acquiring portion 37 does not acquire the abnormal signal, the main calculating portion 32A selects the normal mode as the drive mode of the engine driving portion 36 or updates the drive mode of the engine driving portion 36 to the normal mode. With this, the rotational frequency of the output shaft of the engine E is maintained at a predetermined rotational frequency, and the function of the hydraulic pump 2 can be maximally exerted. On the other hand, when the abnormal signal acquiring portion 37 determines in Step S31 that the determination result indicating that the hydraulic pump 2 has been detached is stored in the storage portion 35, the abnormal signal acquiring portion 37 acquires the abnormal signal, and the process proceeds to Step S33.

In Step S33 that is the restriction mode setting step, the main calculating portion 32A sets the drive mode of the engine driving portion 36 to the restriction mode. When the drive mode is set to the restriction mode, the engine driving portion 36 controls the fuel injection quantity, the ignition timing, and the like for the engine E such that the output shaft rotates at a rotational frequency that is 40% of the predetermined rotational frequency. Thus, when the hydraulic pump 2 is detached (i.e., replaced), the ability of the hydraulic pump 2 is restricted. After the drive mode of the engine driving portion 36 is set in Step S32 or S33, the process proceeds to Step S34.

In Step S34 that is the interval determining step, as with Step S25, whether or not the elapsed time t1 has reached the predetermined determination interval t11 is determined. When it is determined that the elapsed time t1 has not reached the determination interval t11, the determination of Step S34 is repeated until the elapsed time t1 reaches the determination interval t11. On the other hand, when the elapsed time t1 reaches the determination interval t11, the process returns to Step S31, and the abnormality determination is repeated again. It should be noted that: the restriction processing is repeatedly executed until the main switch 23 is turned off; and when the main switch 23 is turned off, and then, is turned on again, the restriction processing starts.

Without driving the main ECU 21A when the main switch 23 is in an off state, the control unit 1A configured as above can detect whether or not the hydraulic pump 2 has been detached. With this, even though the sub ECU 22A is supplied with electric power at all times, the power consumption of the sub ECU 22A is smaller than that of the main ECU 21A, so that the power consumption can be suppressed by driving the sub ECU 22A.

Other than the above, the control unit 1A of Embodiment 2 has the same operational advantages as the control unit 1 of Embodiment 1.

Embodiment 3

Figure 7:
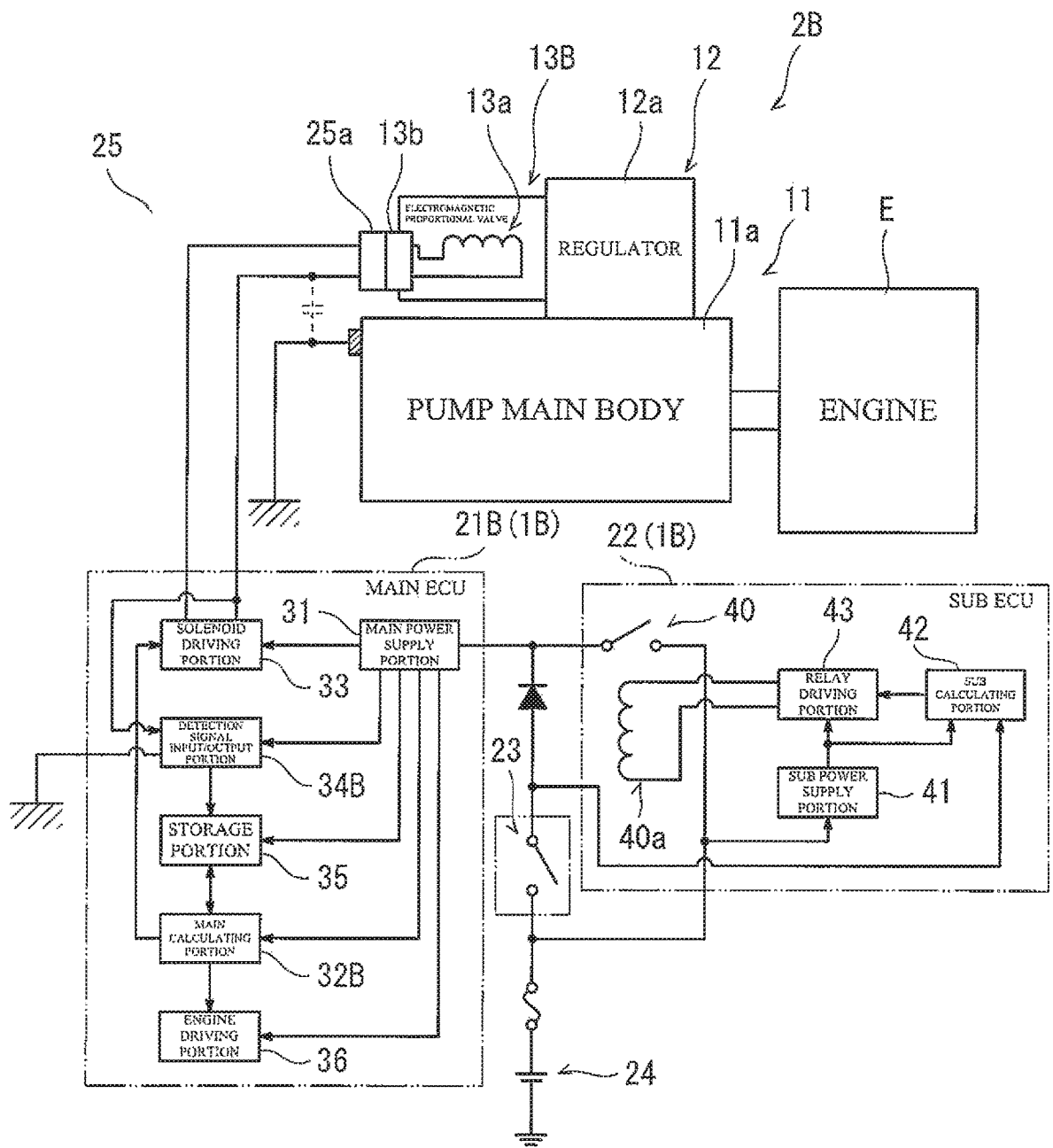
FIG. 7 is a diagram showing a control unit and a hydraulic pump according to Embodiment 3 of the present invention.

The control unit 1B of Embodiment 3 is configured as shown in FIG. 7 and has the following functions. To be specific, unlike the control unit 1A of Embodiment 1, the control unit 1B determines whether or not a hydraulic pump 2B has been detached, based on a stray capacitance at the harness 25 between an electromagnetic proportional valve 13B and the control unit 1B. To be specific, the harness 25 connecting the electromagnetic proportional valve 13B and a main ECU 21B is arranged along the casing 11a of the hydraulic pump main body 11 and the casing 12a of the regulator 12, and the casings 11a and 12a are made of a metal material. The stray capacitance is generated between the harness 25 and the casing 11a and between the harness 25 and the casing 12a. The stray capacitance is basically a constant value as long as the harness 25 is fixed to the vehicle body, the hydraulic pump 2B, or the like. However, the stray capacitance changes when the hydraulic pump 2B is detached for replacement. By utilizing such change, unlike the control unit 1A of Embodiment 1, whether or not the hydraulic pump 2B has been detached is determined based on the stray capacitance at the electromagnetic proportional valve 13B. The control unit 1B having such function includes the main ECU 21B and the sub ECU 22.

The main ECU 21B includes the main power supply portion 31, a main calculating portion 32B, the solenoid driving portion 33, a detection signal input/output portion 34B, the storage portion 35, and the engine driving portion 36. The detection signal input/output portion 34B is constituted by an LCR meter or a measurement circuit constituting the LCR meter. The detection signal input/output portion 34B is connected to an earth-side signal wire and grounded. The earth-side signal wire is one of two signal wires connected to the solenoid 13a of the electromagnetic proportional valve 13B. As with the LCR meter, the detection signal input/output portion 34B configured as above supplies an alternating current, which is the detection signal, to the electromagnetic proportional valve 13B to detect the stray capacitance (i.e., the electrical characteristic) of the harness 25. The detected stray capacitance is output from the detection signal input/output portion 34B to the storage portion 35, and the storage portion 35 stores the detected stray capacitance. The detection signal input/output portion 34B having such function outputs the detection signals at the predetermined determination intervals t11, and the storage portion 35 stores the stray capacitances at the intervals. Then, based on the two stray capacitances stored at different time points, the main calculating portion 32B determines whether or not the hydraulic pump 2B has been detached.

The control unit 1B executes the determination/restriction processing in accordance with the same procedure as the control unit 1 of Embodiment 1 except that a target detected and compared in the determination processing is the stray capacitance instead of the voltage. To be specific, in the control unit 1B, in Step S12 that is the detection signal output step, the detection signal input/output portion 34B outputs the alternating current to detect the stray capacitance of the electromagnetic proportional valve 13B. After the stray capacitance is detected, the process proceeds to Step S13. In Step S13 that is the electrical characteristic storing step, the stray capacitance detected in Step S12 is stored in the storage portion 35 in association with a time point at which the stray capacitance is detected. After the stray capacitance and the time point are stored in the storage portion 35, the process proceeds to Step S14. In Step S14 that is the detachment determination step, the main calculating portion 32B compares the stray capacitance stored in Step S13 with the stray capacitance stored immediately before the stray capacitance stored in Step S13 and determines based on the result of the comparison whether or not the hydraulic pump 2B has been detached. Further, the drive mode is updated in Step S15 or S16 in accordance with the determination result, and the determination processing is terminated.

As above, without using the resistor 13c, the control unit 1B can determine based on the stray capacitance generated at the electromagnetic proportional valve 13B whether or not the hydraulic pump 2B has been detached. Therefore, since whether or not the hydraulic pump 2B has been detached can be determined without providing an additional part at the electromagnetic proportional valve 13B, the manufacturing cost can be reduced.

Other than the above, the control unit 1B of Embodiment 3 has the same operational advantages as the control unit 1A of Embodiment 2.

Embodiment 4

Figure 8:
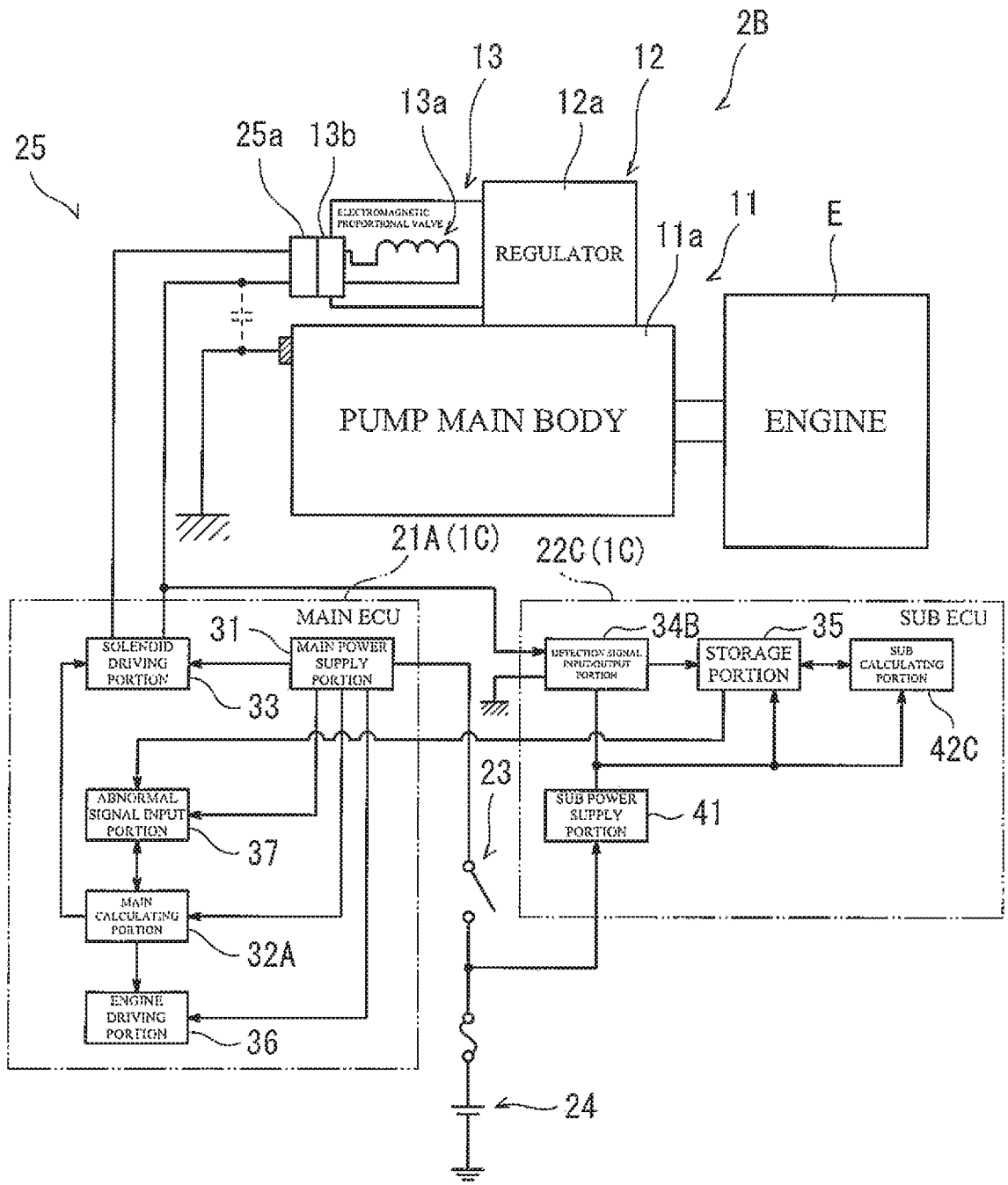
FIG. 8 is a diagram showing a control unit and a hydraulic pump according to Embodiment 4 of the present invention.

The control unit 1C of Embodiment 4 is similar in configuration to the control unit 1 of Embodiment 2 as shown in FIG. 8 and detects the stray capacitance as with the control unit 1B of Embodiment 3. Therefore, components of the control unit 1C of Embodiment 4 which are different from the components of the control units 1, 1A, and 1B of the above embodiments will be mainly described. The same reference signs are used for the same components, and explanations thereof are omitted.

The control unit 1C of Embodiment 4 includes a sub ECU 22C. The sub ECU 22C includes the sub power supply portion 41, a sub calculating portion 42C, the detection signal input/output portion 34B, and the storage portion 35. As described above, the detection signal input/output portion 34B supplies the alternating current, which is the detection signal, to the electromagnetic proportional valve 13B to detect the stray capacitance (i.e., the electrical characteristic) of the harness 25. The detected stray capacitance is output from the detection signal input/output portion 34B to the storage portion 35, and the storage portion 35 stores the detected stray capacitance. The sub calculating portion 42C determines based on the stored stray capacitances whether or not the hydraulic pump 2B has been detached.

The control unit 1C executes the determination processing and the control processing in accordance with the same procedure as the control unit 1A of Embodiment 2 except that a target detected and compared in the determination processing is the stray capacitance instead of the voltage. To be specific, in the control unit 1C, in Step S21 that is the detection signal output step, the detection signal input/output portion 34B outputs the alternating current to detect the stray capacitance of the electromagnetic proportional valve 13B. After the stray capacitance is detected, the process proceeds to Step S22. In Step S22 that is the electrical characteristic storing step, the stray capacitance detected in Step S21 is stored in the storage portion 35 in association with a time point at which the stray capacitance is detected. After the stray capacitance and the time point are stored in the storage portion 35, the process proceeds to Step S23. In Step S23 that is the detachment determination step, the sub calculating portion 42C compares the stray capacitance stored in Step S22 with the stray capacitance stored immediately before the stray capacitance stored in Step S22 and determines based on the result of the comparison whether or not the hydraulic pump 2B has been detached. After the determination, the process returns to Step S21 through Steps S24 and S25, and whether or not the hydraulic pump 2B has been detached is determined again.

As above, as with the control unit 1B of Embodiment 3, without using the resistor 13c, the control unit 1C can determine based on the detected stray capacitance of the harness 25 whether or not the hydraulic pump 2B has been detached. The stray capacitance is surely generated at the harness 25. Therefore, whether or not the hydraulic pump 2B has been detached can be determined without providing an additional part configured to perform determination at the electromagnetic proportional valve 13B. Thus, the increase in the manufacturing cost can be suppressed.

Other than the above, the control unit 1C of Embodiment 4 has the same operational advantages as the control unit 1A of Embodiment 2.

Other Embodiments

In Embodiments 1 and 2, the resistor 13c having a resistance value that is substantially constant regardless of external environment is attached. A thermistor may be adopted as the resistor 13c. The resistance value of the thermistor changes depending on an ambient temperature. The following will describe an example in which the thermistor has a negative characteristic (a characteristic in which the resistance value decreases in accordance with a temperature increase). When the hydraulic pump 2 is continuously equipped, the temperature of the hydraulic pump 2, i.e., the temperature around the thermistor gradually increases. When the temperature increase is slow as above, a decrease of the resistance value is also slow. Therefore, the absolute value of the difference between two voltages compared by the main calculating portion 32 is also small and falls within a predetermined range. On this account, since the absolute value falls within the predetermined range, it is determined that the hydraulic pump 2 has not been detached.

On the other hand, when the hydraulic pump 2 is replaced, the temperature around the thermistor changes significantly. To be specific, since the hydraulic pump 2 is driving until immediately before the replacement, the temperature of the hydraulic pump 2 itself is high. On the other hand, since the new hydraulic pump 2 for the replacement is kept at a room temperature, the temperature of the new hydraulic pump 2 itself is about a room temperature. Therefore, a large temperature difference is generated around the thermistor before and after the replacement, and the resistance value of the thermistor increases significantly. To be specific, the absolute value of the difference between the two voltages detected by the detection signal input/output portion does not fall within the above-described predetermined range. By utilizing a resistance change of the thermistor as above, whether or not the pump 2 has been detached can be determined even after the hydraulic pump 2 is replaced. Therefore, the determination can be performed more accurately. Further, a capacitor or the like having a capacity that changes depending on a temperature may be used instead of the resistor 13c. That is, a part capable of detecting an electrical characteristic can be used instead of the resistor 13c.

The control units 1 and 1A to 1C of Embodiments 1 to 4 determine whether or not the hydraulic pump 2 that is the electromagnetic valve-equipped device has been detached. However, the above embodiments are not necessarily limited to the hydraulic pump 2 itself. To be specific, as with the hydraulic pump 2, the control units 1 and 1A to 1C of Embodiments 1 to 4 can determine whether or not each of the electromagnetic proportional valve 13 and regulator 12 constituting the hydraulic pump 2 has been detached. Further, although whether or not the electromagnetic valve-equipped device has been detached is determined, the electromagnetic valve-equipped device is not limited to the hydraulic pump 2. The electromagnetic valve-equipped device is only required to be a hydraulic device including an electromagnetic valve and may be, for example, the above-described flow control valve. In the case of the flow control valve, the resistor attached to the electromagnetic control valve is grounded through the valve block and the vehicle body, and the stray capacitance is generated by arranging the harness along the valve block. In the control units 1 and 1B of Embodiments 1 and 3, the bypass switch 40 is driven by the relay 40a. However, Embodiments 1 and 3 are not limited to this, and the bypass switch 40 may be turned on and off by using a switching element or the like.

In each of the control units 1 and 1A to 1C of Embodiments 1 to 4, the main calculating portion 32, 32A, or 32B outputs the restriction command to the engine driving portion 36 to restrict the rotational frequency of the output shaft of the engine E and thereby restrict the function of the hydraulic pump 2. However, the restriction of the function is not limited to this. For example, the engine E may be set so as not to be able to drive. Or, instead of restricting the function of the engine E, the hydraulic pump 2 may be restricted. For example, the horsepower of the pump may be restricted by restricting pump power, or the torque of the pump may be restricted. Further, the tilting angle of the hydraulic pump 2 may be set so as not to be able to be changed from a minimum angle, and the function of the hydraulic pump 2 is only required to be restricted. In Embodiments 1 to 4, the hydraulic cylinder is described as one example of the hydraulic actuator. However, the hydraulic actuator is not limited to the hydraulic cylinder and may be a hydraulic motor or the like. Further, although the engine driving portion 36 is provided at the main ECU 21, an engine ECU may be separately provided, and the engine driving portion 36 may be included in the engine ECU.

Further, the control units 1 and 1A to 1C of Embodiments 1 to 4 are applied to travelable construction machines and industrial vehicles. However, Embodiments 1 to 4 are not necessarily limited to these. For example, the control units 1 and 1A to 1C of Embodiments 1 to 4 may be applied to fixed industrial machines. In this case, the power supply device 24 corresponds to a stabilized power supply.

REFERENCE SIGNS LIST 1, 1A to 1C control unit
2, 2B hydraulic pump (electromagnetic valve-equipped device)
13, 13B electromagnetic proportional valve (electromagnetic valve)
13c resistor (resistor portion)
21, 21B main ECU (detachment determining device)
22A, 22C sub ECU (detachment determining device)
23 main switch (main power supply switching unit)
24 power supply device
31 main power supply portion
32, 32B main calculating portion (detachment determining portion, function restricting portion)
32A main calculating portion (function restricting portion)
33 solenoid driving portion (electromagnetic valve driving portion)
34, 34B detection signal input/output portion (electrical characteristic detecting portion)
40 bypass switch (bypass power supply switching portion)
41 sub power supply portion
42A, 42C sub calculating portion (determining portion)

The invention claimed is:

1. A detachment determining device configured to determine whether or not at least a part of an electromagnetic valve-equipped device included in an industrial machine, such as a construction machine or an industrial vehicle, has been detached from the industrial machine, the electromagnetic valve-equipped device being a hydraulic device equipped with an electromagnetic valve,
the detachment determining device comprising:
an electrical characteristic detecting portion configured to output a detection signal to the electromagnetic valve-equipped device and detect an electrical characteristic of the electromagnetic valve-equipped device based on the detection signal; and
a detachment determining portion configured to determine, based on a plurality of electrical characteristics detected at different time points by the electrical characteristic detecting portion, whether or not at least a part of the electromagnetic valve-equipped device has been detached.

2. The detachment determining device according to claim 1, wherein:
the electrical characteristic detecting portion is a resistor portion arranged in the electromagnetic valve and grounded through a component of the electromagnetic valve-equipped device other than the electromagnetic valve;
the resistor portion is electrically insulated from a solenoid that is a component of the electromagnetic valve; and
the detachment determining device outputs the detection signal to the resistor portion and detects an electrical characteristic of the resistor portion based on the detection signal.

3. The detachment determining device according to claim 2, wherein the resistor portion is a thermistor.

4. The detachment determining device according to claim 1, wherein the electrical characteristic detecting portion outputs the detection signal to the electromagnetic valve-equipped device and detects, as the electrical characteristic, a stray capacitance of a wire portion connected to the electromagnetic valve-equipped device.

5. A control unit comprising:
the detachment determining device according to claim 1;
an electromagnetic valve driving portion configured to supply a current to the electromagnetic valve of the electromagnetic valve-equipped device to drive the electromagnetic valve;
a power supply device configured to supply electric power;
a main power supply portion connected to the power supply device and configured to supply the electric power from the power supply device to the electrical characteristic detecting portion and detachment determining portion of the detachment determining device and the electromagnetic valve driving portion;
a main power supply switching unit interposed between the power supply device and the main power supply portion and configured to switch between on and off of electric power supply from the power supply device to the main power supply portion; and
a bypass power supply switching portion configured to supply the electric power from the power supply device to the main power supply portion at predetermined time intervals when the electric power supply from the power supply device to the main power supply portion is in an off state by the main power supply switching unit.

6. A control unit comprising:
the detachment determining device according to claim 1;
an electromagnetic valve driving portion configured to supply a current to the electromagnetic valve of the electromagnetic valve-equipped device to drive the electromagnetic valve;
a power supply device configured to supply electric power;
a main power supply portion connected to the power supply device and configured to supply the electric power from the power supply device to the electromagnetic valve driving portion;
a main power supply switching unit interposed between the power supply device and the main power supply portion and configured to switch between on and off of electric power supply from the power supply device to the main power supply portion; and a sub power supply portion connected to the power supply device without through the main power supply switching unit and configured to supply the electric power from the power supply device to the electrical characteristic detecting portion and detachment determining portion of the detachment determining device.

7. The control unit according to claim 5, further comprising a function restricting portion configured to restrict a function of the electromagnetic valve-equipped device when the detachment determining portion determines that at least a part of the electromagnetic valve-equipped device has been detached.

* * * * *